Patented Mar. 11, 1930

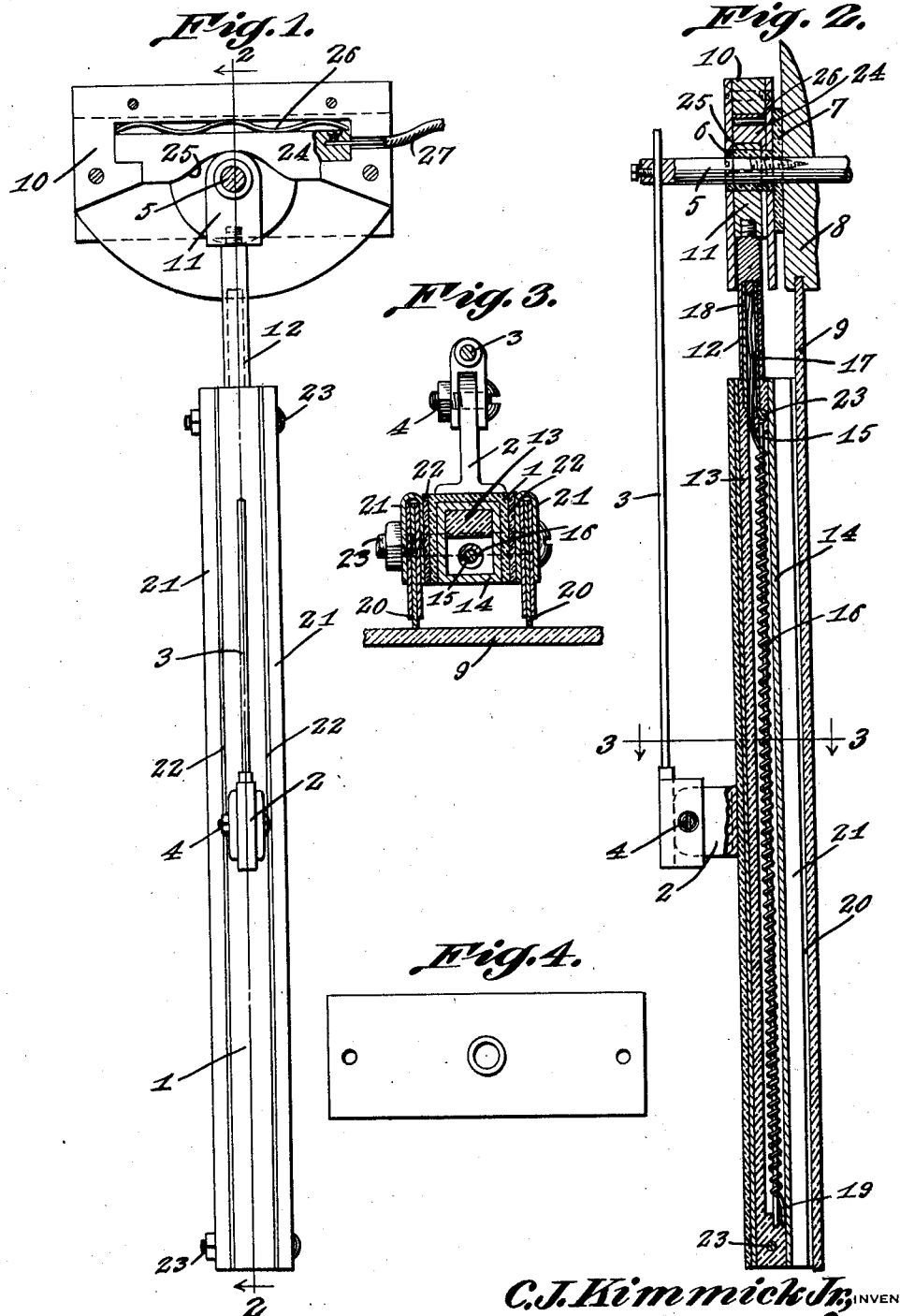

1,750,524

UNITED STATES PATENT OFFICE

CHARLES J. KIMMICK, JR., OF RAHWAY, NEW JERSEY

WINDSHIELD WIPER

Application filed March 8, 1929. Serial No. 345,339.

This invention relates to a windshield wiper, the general object of the invention being to provide a wiper with electrical heating means associated therewith so that ice and the like will be melted from the windshield when the wiper is in operation, with means for conducting an electric current to the heating means in such a manner that the current will flow to such heating means while the device is in operation.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawings wherein like characters denote like or corresponding parts throughout the several views, and in which:—

Figure 1 is a front view, partly in section, of the improved wiper.

Figure 2 is a section on line 2—2 of Figure 1.

Figure 3 is a section on line 3—3 of Figure 2.

Figure 4 is a view of the bushing carrying plate.

In these views, the numeral 1 indicates a channel shaped member which is connected with a lug or bracket 2 to which the wiper rod 3 is pivotally connected, as shown at 4, the upper end of the arm being connected to the shaft 5 of the wiper motor or hand operated device. This shaft passes through a bushing 6 of insulating material which is connected with a plate 7 of insulating material attached to the upper part of the frame 8 of the windshield, the glass of which is shown at 9. Of course, the shaft 5 also passes through this part 8. A casing 10 is seated on the plate 7 and is suitably connected with the part 8, the casing having an opening therein through which the bushing 6 passes.

A member 11 is rotatably arranged on the bushing and a metal stem 12 has its upper end threaded in the lower end of the member 11, with its lower end suitably fastened to an elongated member 13 of non-conducting material which is arranged in a rectangular tube or casing 14 arranged in the channel member 1. The member 13 has its ends enlarged and a core 15 has its ends fitting in openings in the enlarged ends, this core carrying the heating coil 16, the upper end of which is connected by a conductor 17 with the upper end of a metal tube 18 inserted in a bore formed in the stem 12 so that the stem is electrically connected with the conductor 17. The use of this tube 18 in the bore of the stem 12 facilitates the electrical connection of the conductor 17 with the stem. The other end of the coil has an extension 19 thereon which is held against a part of the tube 14 by the lower enlarged end of the member 13. The wiper elements 20 are carried by the U-shaped strips 21, one of which is placed at each side of the channel member 1, with strips 22 of insulating material between the member 1 and said U-shaped members and all the parts are connected together by the bolts 23 which pass through the ends of the U-shaped members or strips 21, the strips 22, the channel shaped member 1, the tube 14 and the enlarged ends of the member 13.

A block 24 of conducting material is slidably arranged in the casing 10 and has a curved lower edge 25 for engaging the curved upper edge of the member 11, the block being held against said member 11 by the corrugated spring strip 26 arranged in the casing above the block. A conductor 27 passes through a hole in the casing and is connected with the block.

Thus it will be seen that when the shaft 5 is rotated, the wiper assembly will be oscillated back and forth over the glass 9 of the windshield and the heat generated in the coil will be transmitted through the inner face of the tube 14 into the space formed by the wiper elements 20 and the glass of the windshield so that the surface of the glass over which the device passes will be heated. The current will pass through conductor 27 into the block 24 and from the block, the current will pass into the member 11, through the stem 12, and conductor 17, into the upper end of the coil, and the current will pass from the coil through the tube 14 and the channel member 1 to bracket 2, through arm 3 into the shaft 5 which is connected with the source of supply.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A wiper of the class described comprising a wiper arm, a heating coil therein, a shaft, a rod connecting the shaft with the wiper arm, means for grounding one end of the coil on the wiper arm which is electrically connected with the rod and the shaft, an insulated bushing through which the shaft passes, a member rotatably arranged on the bushing, a stem connected with the member and with the upper end of the wiper arm, means for electrically connecting the other end of the coil with the stem, said stem being insulated from the wiper arm, a casing surrounding the bushing, a spring pressed block arranged in the casing and bearing against the rotary member and a conductor connected with the block.

2. A wiper of the class described comprising a shaft, a bushing of electrically non-conducting material through which the shaft passes, a casing having an opening therein through which the bushing passes, a member of conducting material rotatably arranged on the bushing and located in the casing, a metal stem connected with said member, a spring pressed block of conducting material in the casing and bearing against the rotary member, a channel-shaped member, a tube of rectangular shape therein, a member of electrically non-conducting material arranged in the tube and having enlarged ends, a core having its ends connected with the enlarged ends of said member, a coil carried by the core, means for connecting one end of the coil with the tube, means for electrically connecting the other end of the coil with the stem, a wiper element connected with each side of the channel shaped member, a bracket connected with the channel shaped member, a rod connected with the bracket and with the shaft and means for supplying current to the block.

In testimony whereof I affix my signature.

CHARLES J. KIMMICK, Jr.